(No Model.)
F. X. COTE & L. CORBEILLE.
SAW GUARD.
No. 522,684. Patented July 10, 1894.
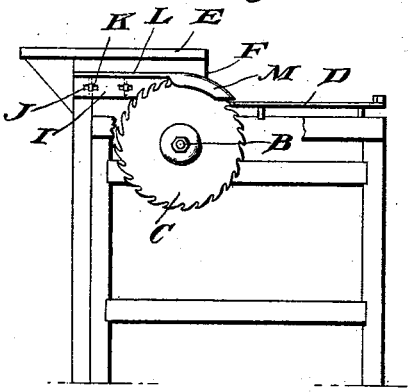
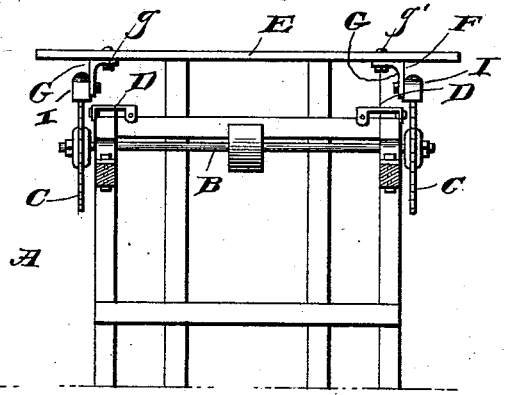
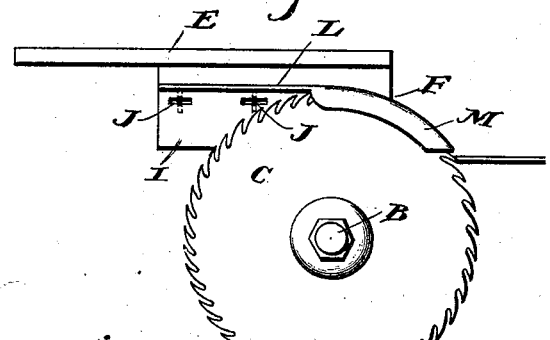
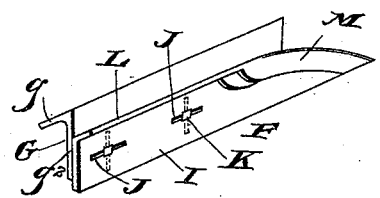
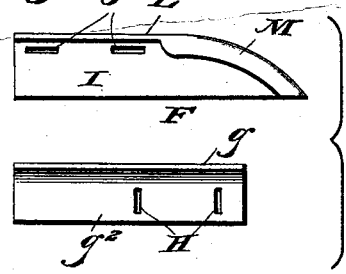
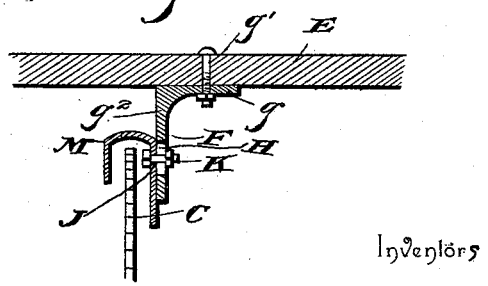
Witnesses
Inventors
François X. Cote,
Louis Corbeille.
By their Attorneys.

UNITED STATES PATENT OFFICE.

FRANCOIS XAVIER COTE AND LOUIS CORBEILLE, OF EVERETT, WASHINGTON.

SAW-GUARD.

SPECIFICATION forming part of Letters Patent No. 522,684, dated July 10, 1894.

Application filed August 17, 1893. Serial No. 483,385. (No model.)

*To all whom it may concern:*

Be it known that we, FRANCOIS XAVIER COTE and LOUIS CORBEILLE, citizens of the United States, residing at Everett, in the county of Snohomish and State of Washington, have invented a new and useful Saw-Guard, of which the following is a specification.

This invention relates to saw guards; and it has for its object to provide an improved saw guard capable of ready attachment to knot sawing machines.

To this end the main and primary object of the present invention is to construct a saw guard especially adapted for use in connection with knot sawing machines which are employed for edging shingles after leaving the shingle machine, and in connection with machines of this character the saw guard is adapted to be adjusted to any sized saw and machine, and is contemplated to provide simple and efficient means for protecting the operator and preventing him from being cut, while at the same time not interfering in any particular with the free operation of the saws.

With these and other objects in view which will readily appear as the nature of the invention is better understood, the same consists in the novel construction, combination and arrangement of parts hereinafter more fully described, illustrated and claimed.

In the accompanying drawings:—Figure 1 is a side elevation of a knot sawing machine showing the improved saw guard in proper position over one of the saws. Fig. 2 is a front view of the same. Fig. 3 is an enlarged detail elevation of the guard in its position over the saw. Fig. 4 is an enlarged detail in perspective of the saw guard attachment complete. Fig 5 is a detail elevation of the saw guard attachment the parts of which are separated from each other. Fig. 6 is a detail sectional view showing the adjustable connection of the guard plate to the flanged attachment plate.

Referring to the accompanying drawings, A represents a knot sawing machine of ordinary construction, which machine is usually employed for edging shingles after leaving the shingle machine.

The frame of the machine A, supports the ordinary transverse saw arbor B, carrying at each end thereof the circular saws C, and adjacent to each of the circular saws C, and also mounted on the frame of the machine A, are the opposite sliding feed tables or carriages D, on which the shingle to be edged up is placed and slid up to the saws by the operator. Usually, this operation is attended with much risk, owing to the rapidity with which it has to be done in order to edge up any quantity of work, and it is the main object of the present invention to reduce this risk to a minimum, while at the same time not interfering with the free operation of the saws as will now be set forth.

Arranged directly over the saws of the machine, is the ordinary receiving table E, which receiving table E, is disposed so as to receive the shingles which fall from the shingle machine before being edged up, and in a knot sawing machine of this character, this receiving table provides convenient means for removably attaching the improved saw guard attachments F, thereto. The saw guard attachments F, have the flanged attachment plates G. The flanged attachment plate G, of each guard attachment is adapted to have the horizontal flange $g$, thereof, removably bolted to the under side of the table E, on the bolts $g'$, so as to dispose the vertical flange $g^2$, at one side of the saw in connection with which the guard is used. The vertical flange of the attachment plate G, is provided with a series of vertically disposed slots H, and adjustably attached to one side of the vertical flange of said attachment plate, is the adjustable guard plate I.

The adjustable guard plate I, of the guard attachment, is provided at suitable points therein with longitudinally disposed slots J, which receive the single combined clamping and adjusting bolts K, which also pass through the vertical slots H, of the attachment plate G. Therefore, the guard plate is longitudinally and vertically adjustable on the stationary attachment plate, whereby the same can be readily and conveniently adjusted to fit the saw in connection with which it is used, so that a sufficient portion of the saw adjacent to the feed table will be exposed, whereby the free operation of sawing will not not be interfered with, while at the same time the operator will be fully protected.

The said longitudinally and vertically adjustable guard plate I, is provided with a top flange L, disposed over the top portion of the saw, and is also provided at its exposed end with the curved flanged guard hood or cap end or portion M.

The flanged guard hood or cap M, at one end of the guard plate I, is U-shaped in cross section to completely cover and overlap the sides of the exposed front and top of the saw above the feed table, and is curved to correspond with the curvature of the saw over which it is located.

It has been already observed that the guard plate is so adjusted that the guard hood or cap thereof will properly cover the unnecessarily exposed part of the saw, so that it will be efficient and practicable in the use for which it is designed.

Changes in the form, proportion and the minor details of construction may be resorted to without departing from the principle or sacrificing any of the advantages of this invention.

Having thus described the invention, what is claimed, and desired to be secured by Letters Patent, is—

The combination with a knot sawing machine having the circular edging saws and the material receiving table directly over and slightly in rear of the saws; of a saw guard attachment consisting of a stationary attachment plate provided with a horizontal flange adapted to be secured to the under side of the receiving table, and a vertical flange provided with vertically disposed slots and adapted to be located at one side of the saws, a longitudinally and vertically adjustable guard plate adapted to flatly abut against the vertical flange of said attachment plate and provided with longitudinally disposed slots J, crossing those of the attachment plate, a horizontal top flange L, overhanging the top edge of the saws under the receiving table, and a curved guard hood or cap M, extended from the front end of said top flange to embrace the exposed front and top portions of the saws beyond the receiving table of the machine and being substantially U-shaped in cross section, and single bolts engaging the crossing slots of both plates to hold the same together and to provide for the adjustment thereof, substantially as set forth.

In testimony that we claim the foregoing as our own we have hereto affixed our signatures in the presence of two witnesses.

FRANCOIS XAVIER COTE.
LOUIS CORBEILLE.

Witnesses:
G. A. CLUM,
N. B. UFFORD.